United States Patent
Yi

[19]

[11] Patent Number: 5,923,553
[45] Date of Patent: Jul. 13, 1999

[54] METHOD FOR CONTROLLING A SEMICONDUCTOR MANUFACTURING PROCESS BY FAILURE ANALYSIS FEEDBACK

[75] Inventor: Min-Ho Yi, Kyungki-do, Rep. of Korea

[73] Assignee: Samsung Electronics Co., Ltd., Suwon, Rep. of Korea

[21] Appl. No.: 08/759,424

[22] Filed: Oct. 5, 1996

Related U.S. Application Data

[30] Foreign Application Priority Data

Dec. 21, 1995 [KR] Rep. of Korea ............... 95-53372

[51] Int. Cl.$^6$ ................................. G06F 19/00
[52] U.S. Cl. ................... 364/468.17; 364/468.28; 364/490; 702/185; 702/84
[58] Field of Search ............ 364/468.15, 468.16, 364/468.17, 468.28, 552, 554, 550, 551.01, 488, 489, 490, 491, 156, 152, 153; 702/182, 183, 184, 185, 186, 81, 82, 83, 84

[56] References Cited

U.S. PATENT DOCUMENTS

| | | | |
|---|---|---|---|
| 3,751,647 | 8/1973 | Maeder et al. | 364/552 X |
| 4,571,685 | 2/1986 | Kamoshida | 364/468.28 X |
| 5,047,947 | 9/1991 | Stump | 364/468.28 X |
| 5,196,997 | 3/1993 | Kurtzberg et al. | 364/152 |
| 5,479,340 | 12/1995 | Fox et al. | 364/468.28 X |
| 5,526,293 | 6/1996 | Mozumder et al. | 364/468.28 X |

*Primary Examiner*—Joseph Ruggiero
*Attorney, Agent, or Firm*—Jones & Volentine, L.L.P.

[57] ABSTRACT

A method for controlling a semiconductor manufacturing process by failure analysis feedback compares a previous failure analysis result with current real-time process conditions. The method uses the steps of: a) establishing a monitoring data base with abnormal process condition data, the abnormal process condition data being obtained by a correlation between a yield for each manufactured lot and corresponding process conditions for semiconductor equipment when the yield is lowered or semiconductor equipment malfunctions have occurred; b) establishing an equipment data base by obtaining real-time process conditions for on-line semiconductor equipment; c) comparing the real-time process conditions for the on-line semiconductor equipment with the abnormal process conditions of the monitoring data base; and d) stopping the operation of the on-line semiconductor equipment when differences between the real-time and abnormal process conditions fall below a predetermined level.

4 Claims, 2 Drawing Sheets

METHOD FOR CONTROLLING A SEMICONDUCTOR MANUFACTURING PROCESS BY FAILURE ANALYSIS FEEDBACK

BACKGROUND OF THE INVENTION

1. Field of the Invention

The present invention relates to a method for controlling a semiconductor manufacturing process, and more particularly to a method for controlling a semiconductor manufacturing process by failure analysis feedback.

2. Description of the Prior Art

Generally, a semiconductor device is manufactured by lots under the same process conditions, and then subjected to an electrical test for each die. Bad dies and good dies are checked and electrically sorted to determine a yield per lot or per wafer. After the semiconductor manufacturing processes for a certain lot are completed, failure analysis is performed to search for a correlation, if any, among the manufacturing processes which influence the final yield.

Referring now to FIG. 1, there is illustrated a failure analysis system in accordance with the prior art. The failure analysis system includes an equipment data base 12 and a yield data base 22. The equipment data base 12 records certain conditions of a semiconductor manufacturing process which was run, including among others, such process conditions as temperature, pressure, vacuum level, and the type and composition of gases used. Such fabrication lot process history data is identified as Step 10 in FIG. 1.

In the yield data base 22, there is recorded a yield per lot, the yield being obtained by checking and sorting bad dies and good dies through electrical testing of each die. Such an electrical die sort (EDS) yield process is identified as Step 20 in FIG. 1.

When checking the yield for each lot through the electrical die sort EDS to form the yield data base 22, an abnormal wafer and the equipment for which a yield decrease has occurred is identified. Defects generated by a specific process condition or abnormal equipment conditions are predicted and sorted (Step 24). Also, a normal wafer or equipment operation is sorted by reference to the equipment data base 12 (Step 14).

The abnormal equipment data and the normal equipment data are merged (Step 30) and compared to each other by analysis of the correlation among the yield, the equipment and the process conditions, the analysis being performed by either or both of a statistical process, such as a significance test, or visual analysis such as graphic processing (Step 40). Then, a unit process equipment, which led to a decrease in the yield, is searched to estimate a failure by checking the equipment conditions and the process conditions (Step 50).

However, in such a conventional failure analysis system, it takes a long time to analyze the failure. Also, even if the failure is rapidly analyzed, the failure analysis is performed on the basis of the run already completed. Although the failure analysis has been accomplished, the wafer manufacturing process still continued under the abnormal process conditions for the subsequent run. As such, the generation of the failure or the yield decrease cannot be prevented during the current, on-line semiconductor process run.

SUMMARY OF THE INVENTION

Accordingly, the present invention is directed to a method for controlling a semiconductor manufacturing process by failure analysis feedback, which substantially overcomes one or more limitations of the prior art.

It is an object of the present invention to provide a method for controlling a semiconductor manufacturing process by failure analysis feedback which compares a previous failure analysis result with current real-time process conditions. The operation of a corresponding process equipment is stopped immediately after a process condition having a failure has occurred.

According to one aspect of the present invention, there is provided a method for controlling a semiconductor manufacturing process by failure analysis feedback, the method comprising the steps of: a) establishing a monitoring data base with abnormal process condition data, the abnormal process condition data being obtained by a correlation between a yield for each manufactured lot and corresponding process conditions for semiconductor equipment when the yield is lowered or semiconductor equipment malfunctions have occurred; b) establishing an equipment data base by obtaining real-time process conditions for on-line semiconductor equipment; c) comparing the real-time process conditions for the on-line semiconductor equipment with the abnormal process conditions of the monitoring data base; and d) stopping the operation of the on-line semiconductor equipment when differences between the real-time and abnormal process conditions fall below a predetermined level.

In another aspect, the method allows the operation of the on-line semiconductor equipment to continue when differences between the real-time and abnormal process conditions do not fall below a predetermined level.

In still another aspect, the method stops the operation of the on-line semiconductor equipment when differences between the real-time and normal process conditions exceed a predetermined level.

According to another aspect of the present invention, the step of establishing a monitoring data base comprises the steps of: e) sorting yield data for each abnormally manufactured lot wherein an abnormal yield decrease or yield variation has occurred due to a semiconductor equipment or process condition malfunction; f) analyzing the sorted yield data to determine a cause of a failure by linking the abnormally manufactured lot number with a corresponding lot number and equipment history data from the equipment data base; g) reading the linked equipment history data from the equipment data base and editing the process condition data for each lot; and h) generating a report based on the edited process condition data and displaying a yield trend corresponding to the semiconductor equipment history for each lot.

By the features of the present invention, a semiconductor manufacturing line is monitored on-line to establish an equipment history data base in real-time. An abnormal state of equipment which is presently running is detected with reference to a previously established monitoring data base by failure analysis.

If abnormal process conditions are detected, it is assumed that a decrease in the yield will result and the operation of the equipment is stopped. This makes it possible to identify, in real-time, trouble in a process to prevent failures and a decrease in yield.

BRIEF DESCRIPTION OF THE DRAWINGS

The above objects, other features and advantages of the present invention will be more apparent after a reading of the following detailed description taken in conjunction with the drawings, in which.

DETAILED DESCRIPTION OF THE PREFERRED EMBODIMENT

Figure 1:
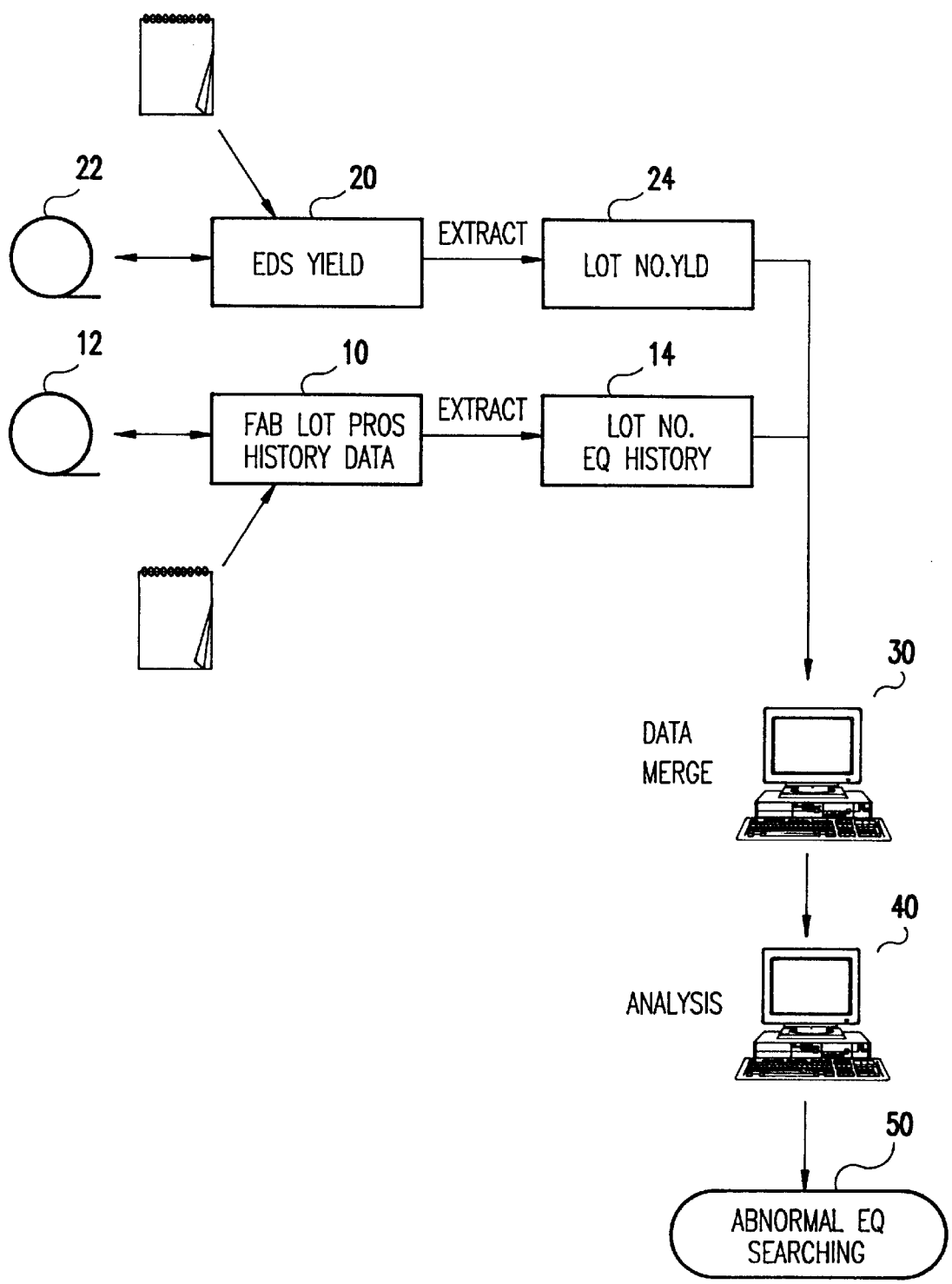
FIG. 1 is a systematic diagram illustrating a failure analysis system of the prior art.
Figure 2:
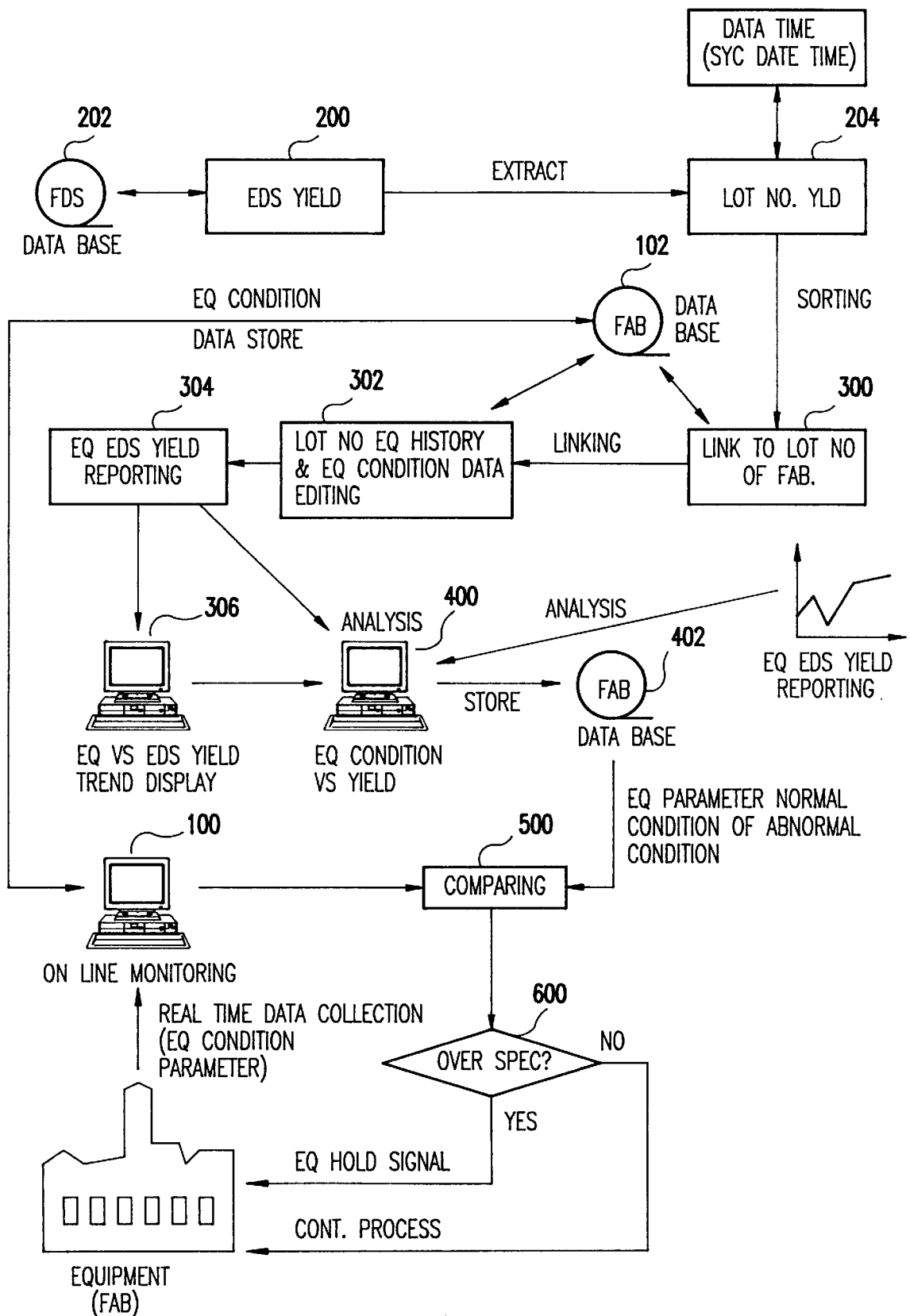
FIG. 2 is a systematic diagram illustrating a method for controlling a semiconductor manufacturing process by failure analysis feedback in accordance with an embodiment of the present invention.

Reference will now be made in detail to an embodiment of this semiconductor method with reference to FIG. 2.

In manufacturing a semiconductor, a plurality of semiconductor chips, i.e., die, having the same pattern are manufactured on a wafer under the same process conditions while moved along an automation line. The die undergo various unit processes such as photolithography, ion implantation, heat treatment, etching, deposition, metal processing, etc. Each unit process has an equipment history including corresponding equipment and process conditions such as temperature, pressure, vacuum level, type and composition of gases used, etc. The equipment history is recorded by a number for each lot. Such equipment history is monitored on a real-time basis by on-line monitoring equipment 100 as shown in FIG. 2. The equipment history obtained for each lot is recorded in an equipment data base 102.

The semiconductor device prepared through the above manufacturing process is subjected to a testing process (Step 200) where it is determined whether a die on the wafer is good or bad. Depending upon the results of the testing process, a bad die is marked with an inking, and yield data which is obtained for the lot by the testing process is recorded in a yield data base 202. The yield data for an abnormal lot is sorted into an abnormal yield decrease or a yield variation due to equipment trouble and the like (Step 204). To analyze the cause of the failure, the abnormal lot number is linked with a corresponding lot number of the equipment data base 102 (Step 300).

Then, data about process conditions for the lot are edited by reading the history of the linked equipment from the equipment data base 102 (Step 302). A report is generated (Step 304) from the edited data, and a yield trend corresponding to the equipment for the lot is displayed (Step 306).

In Step 400, the abnormal EDS yield decrease or the abnormal yield variation due to equipment or process trouble is analyzed by a statistical analysis algorithm such as a feedback analysis, a significance test or the like, with reference to the contents of the report. Process conditions of the equipment according to the correlation between the analyzed abnormal equipment and the yield thereof are recorded to a monitoring data base 402.

In Step 500, the process conditions for the equipment which is presently on-line and running are compared, in real-time, with monitoring process conditions obtained from the monitoring data base 402 by the on-line monitoring equipment 100. If the result of the comparison is within a predetermined level, the equipment continues to operate. In other words, the real-time process conditions and the process conditions stored in the monitoring data base as being known to cause abnormal yield are compared, and if differences between them do not fall below a predetermined level, the equipment continues to operate. On the contrary, the differences fall below the predetermined level, the operation of the equipment is stopped (Step 600). In addition, the real-time process conditions and the process conditions stored in the monitoring data base as being known to cause normal yield are also compared, and if differences between them exceed a determined level, the operation of the equipment is stopped.

As described above, according to the present invention, a semiconductor manufacturing line is monitored on-line to establish an equipment history data base in real-time. The abnormal state of equipment which is presently running is detected with reference to a previously established monitoring data base by failure analysis. If abnormal process conditions are detected, it is assumed a decrease in the yield is possible and the operation of the equipment is stopped. With the present invention, therefore, it is possible to react, in real-time, to identify abnormalities in a semiconductor manufacturing process, such that a decrease in yield and failures can be prevented.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A method for controlling a semiconductor manufacturing process by failure analysis feedback, the method comprising the steps of:

a) establishing a monitoring data base with abnormal process condition data, the abnormal process condition data being obtained by a correlation between a yield for each manufactured lot and corresponding process conditions for semiconductor equipment when the yield is lowered or semiconductor equipment malfunctions have occurred;

b) establishing an equipment data base by obtaining real-time process conditions for on-line semiconductor equipment;

c) comparing the real-time process conditions for the on-line semiconductor equipment with the abnormal process conditions of the monitoring data base; and d) stopping the operation of the on-line semiconductor equipment when differences between the real-time and abnormal process conditions fall below a predetermined level.

2. A method for controlling a semiconductor manufacturing process by failure analysis feedback as claimed in claim 1, further comprising the step of: allowing the operation of the on-line semiconductor equipment to continue when differences between the real-time and abnormal process conditions do not fall below a predetermined level.

3. A method for controlling a semiconductor manufacturing process by failure analysis feedback as claimed in claim 1, further comprising the step of: stopping the operation of the on-line semiconductor equipment when differences between the real-time and normal process conditions exceed a predetermined level.

4. A method for controlling a semiconductor manufacturing process by failure analysis feedback as claimed in claim 1, wherein said step of establishing a monitoring data base further comprises the steps of:

e) sorting yield data for each abnormally manufactured lot wherein an abnormal yield decrease or yield variation has occurred due to a semiconductor equipment or process condition malfunction;

f) analyzing the sorted yield data to determine a cause of a failure by linking the abnormally manufactured lot number with a corresponding lot number and equipment history data from the equipment data base;

g) reading the linked equipment history data from the equipment data base and editing the process condition data for each lot; and h) generating a report based on the edited process condition data and displaying a yield trend corresponding to the semiconductor equipment history for each lot.

* * * * *